(12) United States Patent
Grune et al.

(10) Patent No.: US 6,293,153 B1
(45) Date of Patent: Sep. 25, 2001

(54) DEVICE FOR GRAVIMETRIC METERING AND PNEUMATIC SUCTION CONVEYING OF FLUIDIZABLE BULK MATERIALS

(75) Inventors: Burkhard Grune, Burghausen; Helmut Huber, Emmerting; Dieter Duschl, Burgkirchen, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/426,915

(22) Filed: Oct. 26, 1999

(30) Foreign Application Priority Data

Nov. 4, 1998 (DE) ............................................. 198 50 821

(51) Int. Cl.$^7$ ...................................................... G01L 7/00
(52) U.S. Cl. ................................................................ 73/714
(58) Field of Search ........................ 73/714, 708, 861.42, 73/861.43, 861.44, 861.45, 861.351, 861.352, 861.353, 861.354

(56) References Cited

FOREIGN PATENT DOCUMENTS

| 155611 | 3/1970 | (DE) . |
|---|---|---|
| 27 14355 | 10/1978 | (DE) . |
| 32 01105 | 10/1983 | (DE) . |
| 40 14 229 | 11/1991 | (DE) . |
| 40 14229 | 11/1991 | (DE) . |
| 41 09 960 | 10/1992 | (DE) . |
| 195 42 787 | 11/1995 | (DE) . |
| 44 43053 | 6/1996 | (DE) . |
| 0297463 | 1/1989 | (EP) . |

OTHER PUBLICATIONS

English Derwent Abstract corresp. to DE 40 14229 A1 (above).
English Derwent Abstract corresp. to DE 27 14355 A1 (above).
Summary corresp. to DE 155611 (above).
English Derwent Abstract [1997–282104 [26]] corresp. to DE 195 42 787 A1.
English Derwent Abstract [1991–333655[46]] corresp. to DE 40 14 229 C2.
English Derwent Abstract [1992–332906[41]] corresp. to DE 41 09 960 A1.
English Derwent Abstract [1983–737046[33]] corresp. to DE 3201 105 C1.
English Derwent Abstract [1996–287315[29]] corresp. to DE 44 43 053 A1.

*Primary Examiner*—William Oen
(74) *Attorney, Agent, or Firm*—Collard & Roe, P.C.

(57) ABSTRACT

A device for the metering of fluidizable bulk materials, having a storage tank and a mass-flow-measuring device for the material and a fluidizing device, which is connected to the storage tank via an aperture of adjustable size, and a control valve for controlling the supply of compressed air to the fluidizing device, wherein a pressure gauge is provided downstream of the fluidizing device, in the direction of flow, and the pressure gauge and control valve are connected via a first control circuit, and the supply of compressed air to the fluidizing device is metered by this control circuit in such a manner that a constant, in each case preselectable subatmospheric pressure prevails in the fluidizing device, and the mass-flow-measuring device and the aperture of adjustable size are connected via a second control circuit, and the size of the adjustable aperture is set by this control circuit in such a manner that a defined quantity of bulk material enters the fluidizing device.

5 Claims, 2 Drawing Sheets

DEVICE FOR GRAVIMETRIC METERING AND PNEUMATIC SUCTION CONVEYING OF FLUIDIZABLE BULK MATERIALS

BACKGROUND OF THE INVENTION

1. Field of the invention

The present invention relates to a device for gravimetric metering and pneumatic suction conveying of fluidizable bulk materials.

2. The Prior Art

The metering and pneumatic conveying of the metered quantities of fluidizable bulk materials is fundamentally known. The materials can be conveyed from a storage tank into a receiving vessel by means of pressure conveying or by means of suction conveying. DE 4,109,960 A1, in column 1, second paragraph, mentions the advantages of suction conveying over pressure conveying and describes an installation for pneumatic suction conveying in which measures are taken in order to minimize the risk of blockage.

Another problem of suction conveying is the metering accuracy of the bulk material which is conveyed. In the past, volumetric metering of the bulk material has been known for suction conveying. Due to the changing subatmospheric pressures in the receiving vessel and therefore in the conveying line, this method is unsuitable for accurate metering of the bulk material. For this reason, suction conveying has in the past been unsuitable in particular for modern production installations in which it is necessary to meter changing bulk materials with a high level of accuracy.

SUMMARY OF THE INVENTION

It is an object of the present invention to provide a device which allows fluidizable bulk materials to be metered with a high level of accuracy under the conditions of suction conveying.

The above object is achieved by the present invention which provides a device for the metering of fluidizable bulk materials, having a storage tank and a mass-flow-measuring device for the material and a fluidizing device, which is connected to the storage tank via an aperture of adjustable size, and a control valve for controlling the supply of compressed air to the fluidizing device. A pressure gauge is provided downstream of the fluidizing device, in the flow direction and the pressure gauge and control valve are connected via a first control circuit, and the supply of compressed air to the fluidizing device is metered by this control circuit in such a manner that a constant. In each case preselectable subatmospheric pressure prevails in the fluidizing device, and the mass-flow-measuring device and the aperture of adjustable size are connected via a second control circuit, and the size of the adjustable aperture is set by means of this control circuit in such a manner that a defined quantity of bulk material enters the fluidizing device.

The mass-flow-measuring device is preferably a "loss in weight" mass-flow-measuring device.

The device according to the invention preferably comprises a valve, which allows fluidizable material to be branched off from the suction line and, if appropriate, to be returned to a return vessel, downstream of the pressure gauge, as seen in the direction of flow.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
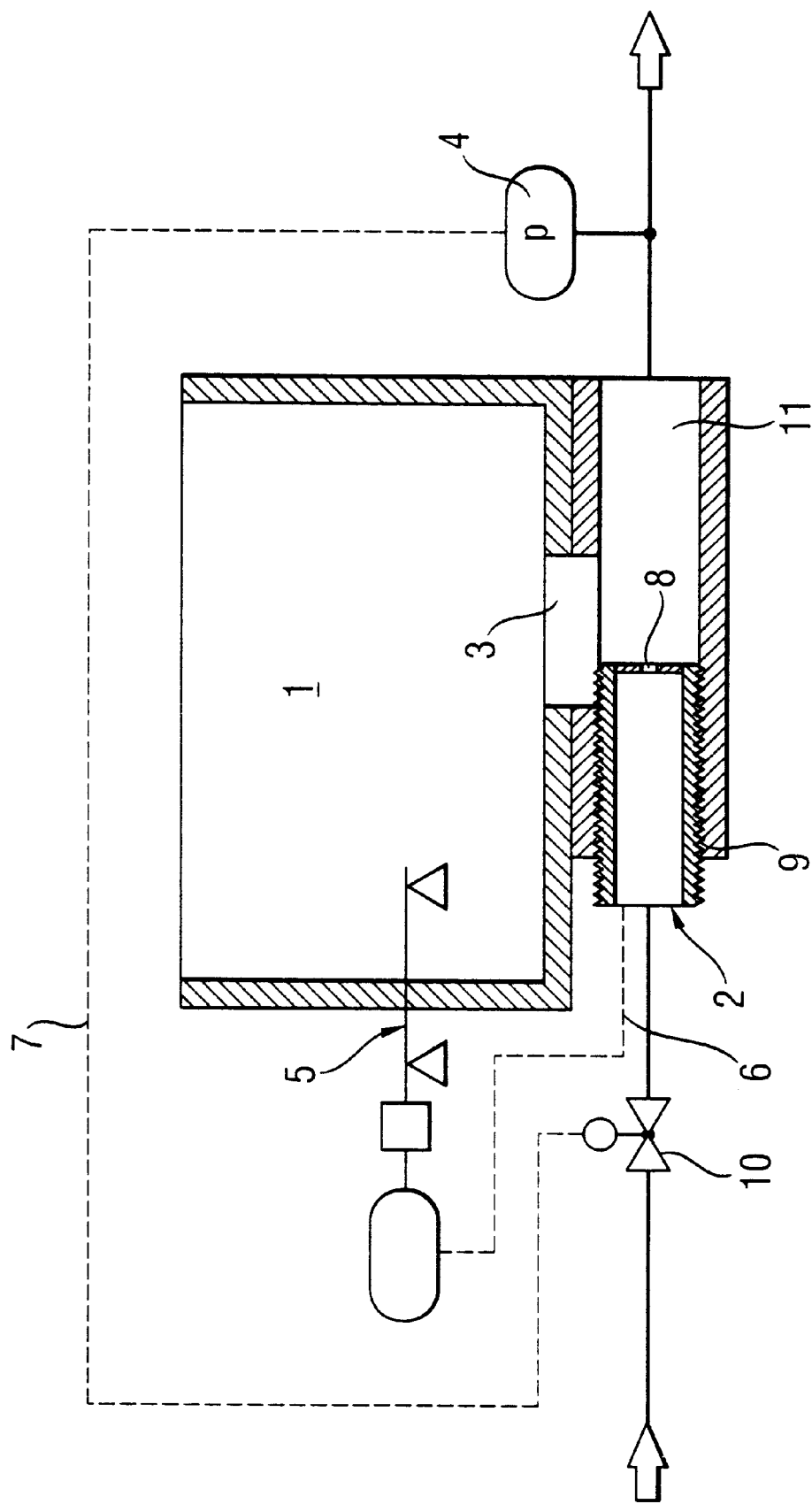
FIG. 1 shows a device for the gravimetric metering of fluidizable bulk materials in a suction conveying system.

Turning now in detail to the drawings, FIG. 1 shows the aperture 3 of adjustable size located between the storage tank 1 and the fluidizing device 2. Downstream of the fluidizing device 2 as seen in the flow direction of the material, the device has a pressure gauge 4. The device contains a mass-flow-measuring device 5 for the fluidizable material, in the form of a differential balance. The mass-flow-measuring device 5 is located upstream of the fluidizing device 2, as seen in the flow direction of the fluidizable material. The mass-flow-measuring device 5 is connected to the aperture 3 of adjustable size via a first control circuit 6 and, by varying the size of the aperture, controls the mass flow of the bulk material into the fluidizing device 2.

The fluidizing device 2 is formed by a gas-discharge opening 8 in the form of a nozzle, through which a fluidizing gas, preferably compressed air, comes into contact with the material which is to be fluidized. The nozzle 8 can be moved, (for example by means of a screw thread 9) in or counter to the direction of flow of the fluidizable material, in such a manner that the adjustable size aperture 3 is made narrower or wider by this movement. The particular size of the aperture is controlled by means of the first control circuit 6 which has already been mentioned above.

The pressure at which the fluidizing gas enters the fluidizing chamber 11 through the gas-discharge opening 8 is set by means of a pressure regulator 10, via second control circuit 7 which is controlled by the pressure at the pressure gauge 4, in such a manner that a constant subatmospheric pressure prevails in the area of the adjustable aperture.

The fluidizable material, which is in the form of a finely particulate bulk material, moves from the storage tank 1, through the aperture 3 which is of adjustable size, into the fluidizing chamber 11 due to the subatmospheric pressure which prevails in the fluidizing device 2. In this fluidizing chamber 11, the fluidizing gas comes into contact with the material and renders it able to flow. By adjusting the aperture 3 and the fluidizing-gas pressure, it is possible for the flow of fluidizable material and the subatmospheric pressure used for suction conveying to be regulated independently of one another, quickly and with a high level of accuracy within wide ranges.

Figure 2:
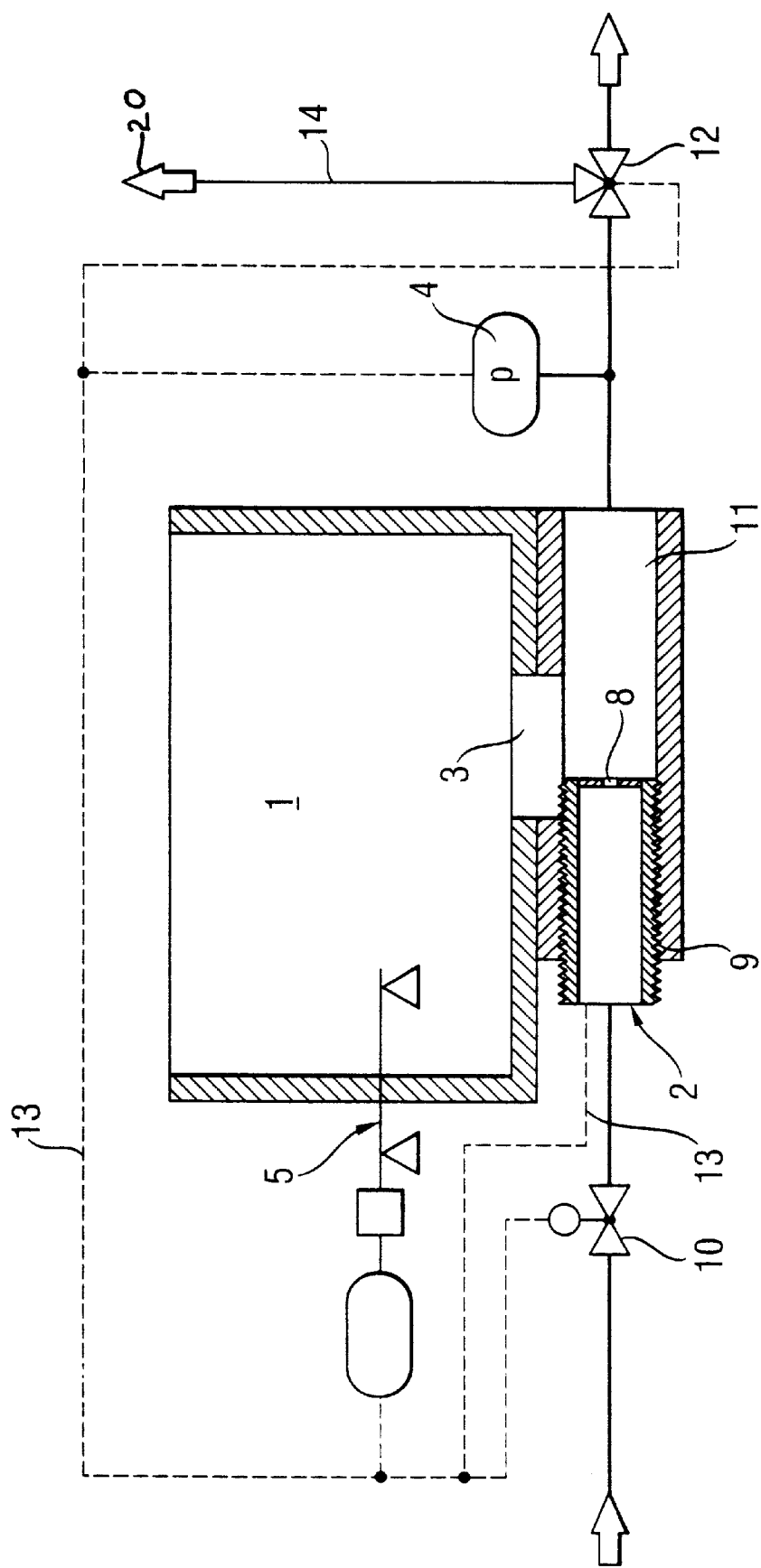
FIG. 2 shows a preferred embodiment of the device of the invention.

FIG. 2 shows a preferred embodiment of the invention. In addition to the structure described in FIG. 1, this embodiment has a second valve 12 downstream of the pressure gauge 4, as seen in the flow direction. This valve 12 makes it possible to branch off fluidizable material and, if appropriate, to return it through supply line 14 to a return vessel 20, for as long as, according to the mass-flow-measuring device 5, the metered mass flow is not yet or is no longer within the desired metering range. This valve 12 can likewise be controlled by means of the first control circuit 6. In the preferred embodiment illustrated in FIG. 2, the control circuits 6 and 7 are linked to form a combined control circuit 13. Such a combined control circuit 13 is preferred over two separate control circuits. It allows all said measuring and control devices to influence one another, and thus enables the metering and the pressure conditions in the suction conveying to be regulated even more quickly and even more finely.

By changing the aperture size in a controlled manner and changing the pressure of the fluidizing gas in a controlled manner, the device according to the invention enables both the subatmospheric pressure in the area of the fluidizing device and the mass flow of the bulk material to be varied and set in a very controlled and accurate manner. Furthermore, linking the control circuits for the aperture size and the change in pressure of the fluidizing gas, as well as a corresponding presetting of the parameters of the control circuit, allows automatic regulation of the parameters and automatic adaptation of the parameters to the prevailing optimum operating condition.

In a preferred embodiment, the metered flow may be diverted downstream of the pressure-measuring device by means of a valve 12. This allows the flow of fluidizable material to be branched off from the metered flow during the start-up time of the device, i.e. while the metering is not yet accurate enough. In this connections it may be useful to provide a storage tank for the material which has been branched off or a device for returning this material to the storage tank 1 in the device. Moreover, using the valve 12 it is also possible to temporally coordinate the flow of fluidizable material with other product streams.

The device according to the invention makes it possible to meter even extremely small quantities of lightweight and fluidizable bulk materials into vacuum chambers or reduced-pressure lines with a high level of accuracy. Depending on requirements, it is also possible to maintain a defined subatmospheric pressure in the receiving container.

The device according to the invention is eminently suitable for the continuous metering of finely particulate solids of low bulk density in suction conveying. Due to the controlled feed of compressed air through the fluidizing nozzle, the metering takes place at a constant subatmospheric pressure in the area of the metering device and is thus independent of any fluctuations which may arise in the suction line, for example as a result of pressure fluctuations in the receiving vessel.

In conjunction with the pressure regulator 10 (flow-regulating valve), the air from the nozzle ensures that there is a uniform differential pressure and thus a uniform suction flow in the conveying direction even in the event of process-related fluctuations in the subatmospheric pressure of about 100 to 750 mbar.

The device according to the invention is particularly suitable for the fine gravimetric metering of bulk materials in quantities of preferably 500 g/h to 200 kg/h.

The device allows metering with high short-term accuracy. In addition, it allows simple conversion to different bulk materials with a very wide range of product properties. Even solids whose bulk density is extremely dependent on pressure can be metered with precision.

The device can be used, for example, for metering finely particulate fillers, for example to produce polymer mixtures, antifoam agents and many more such substances. The device is particularly suitable for metering finely particulate, fluidizable bulk materials in dynamic mixers which operate continuously at subatmospheric pressure.

Examples of fillers which may be metered using the device according to the invention are non-reinforcing fillers, i.e. fillers with a BET surface area of up to 50 $m^2/g$, such as quartz, diatomaceous earth, calcium silicate, zirconium silicate, zeolites, metal oxide powders, such as aluminum, titanium, iron or zinc oxides or mixed oxides thereof, barium sulfate, calcium carbonate, gypsum, silicon nitride, silicon carbide, boron nitride, glass and plastic powders; reinforcing fillers, i.e. fillers with a BET surface area of more than 50 $m^2/g$, such as pyrogenically produced silica, precipitated silica, carbon black, such as furnace soot and acetylene black, and silicon-aluminum mixed oxides with a high BET surface area; fibrous fillers, such as asbestos and plastic fibers. These fillers may be made water repellent, for example by treatment with organosilanes or organosiloxanes or by etherification of hydroxyl groups to form alkoxy groups.

The device according to the invention is particularly suitable for metering finely divided silica.

The fluidizable material may be mixed with other constituents in a mixer, kneader, agitator or the like.

Examples of such other constituents are constituents of plastics mixtures, such as hardeners or cross linking agents, catalysts, polymers, plasticizers, bonding agents, fragrances, UV-absorbers, bactericides, fungicides and pigments.

Examples of polymers are organic, synthetic polymers, such as polyvinyl chloride, polyethylene, polypropylene, polyvinyl acetate, polycarbonate, polyacrylate, polymethacrylate, polymethyl methacrylate, polystyrene, polyacrylonitrile, polyvinylidene chloride, polyvinyl fluoride, polyvinylidene fluoride, polyvinylidene cyanide, polybutadiene, polyisoprene, polyether, polyester, polyamide, polyimide, silicones, polyvinyl alcohol, polyvinylpyrrolidone, polyacrylamide, polyethylene glycol and derivatives thereof and the like, including copolymers, such as styrene/acrylate copolymers, vinyl acetate/acrylate copolymers and ethylene/vinylacetate copolymers, as well as natural polymers, such as cellulose, starch, casein and natural rubber, as well as semi-synthetic compounds with a high molecular weight, such as cellulose derivatives, e.g. methyl cellulose, hydroxymethylcellulose and carboxymethylcellulose.

Accordingly, while a few embodiments of the present invention have been shown and described, it is to be understood that many changes and modifications may be made thereunto without departing from the spirit and scope of the invention as defined in the appended claims.

What is claimed is:

1. A device for the gravimetric metering of fluidizable bulk materials in a suction-conveying system, comprising a storage tank having a mass-flow-measuring device for material contained in said storage tank;

a fluidizing device, which is connected to the storage tank via an aperture of adjustable size;

a control valve for controlling a supply of compressed air to the fluidizing device;

a pressure gauge provided downstream of the fluidizing device, in flow direction;

the pressure gauge and the control valve are connected via a first control circuit, and the supply of compressed air to the fluidizing device is metered by this control circuit in such a manner that a constant, in each case preselectable subatmospheric pressure prevails in the fluidizing device;

the mass-flow-measuring device and the aperture of adjustable size are connected via a second control circuit, and the size of the adjustable aperture is set by means of the second control circuit in such a manner that a defined quantity of bulk material enters the fluidizing device.

2. The device as claimed in claim 1, comprising a second valve which allows fluidizable material to be branched off from the suction line and, if appropriate, to be guided into a return vessel, is provided downstream of the pressure gauge, as seen in the flow direction.

3. The device as claimed in claim 2, wherein the second valve is incorporated in the first control circuit.

4. The device as claimed in claim 1, wherein the mass-flow-measuring device is a "loss in weight" mass-flow-measuring device.

5. The device as claimed in claim 1, wherein the first control circuit and the second control circuit are linked to form a combined control circuit.

* * * * *